Patented Jan. 20, 1931

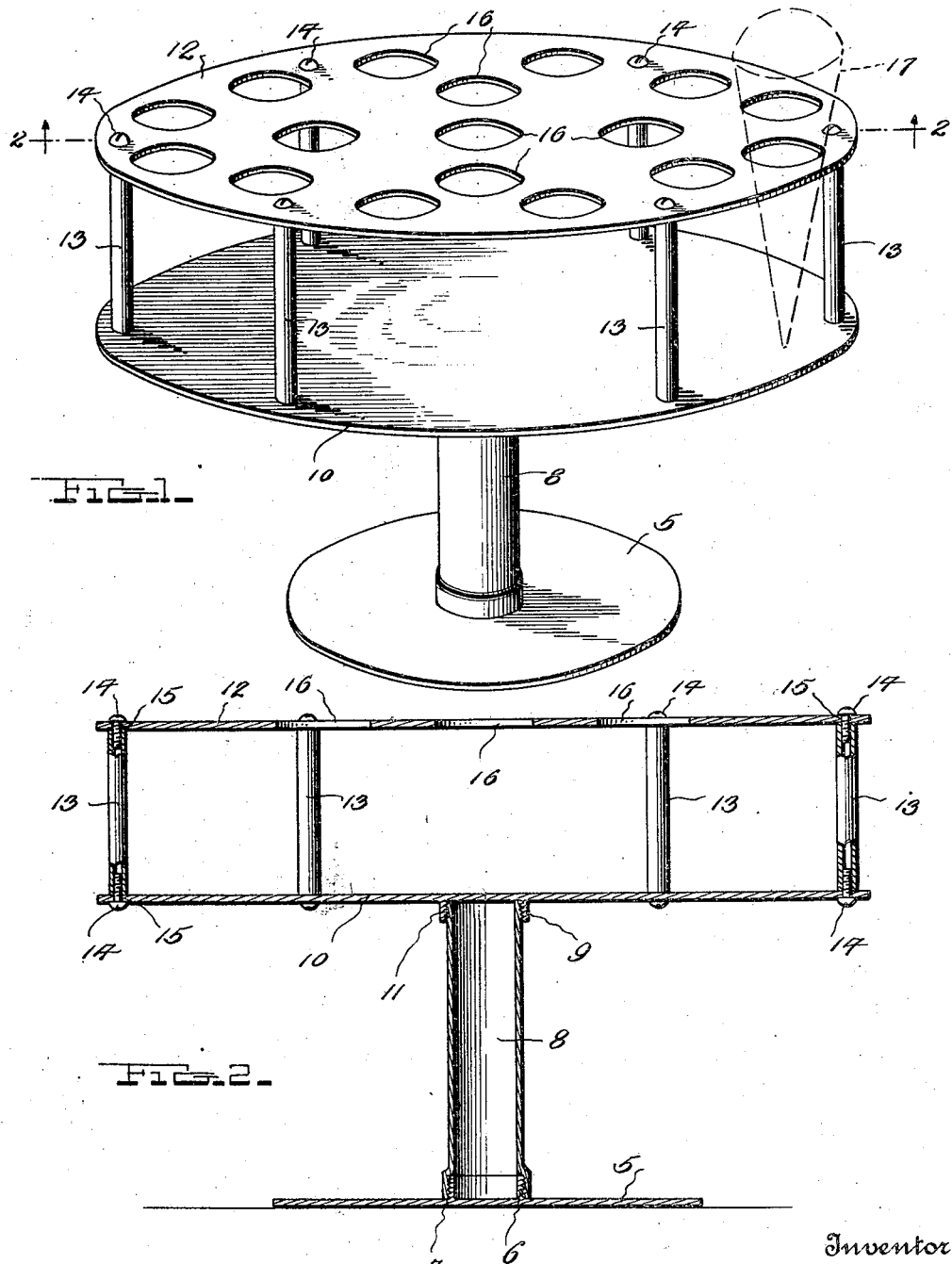

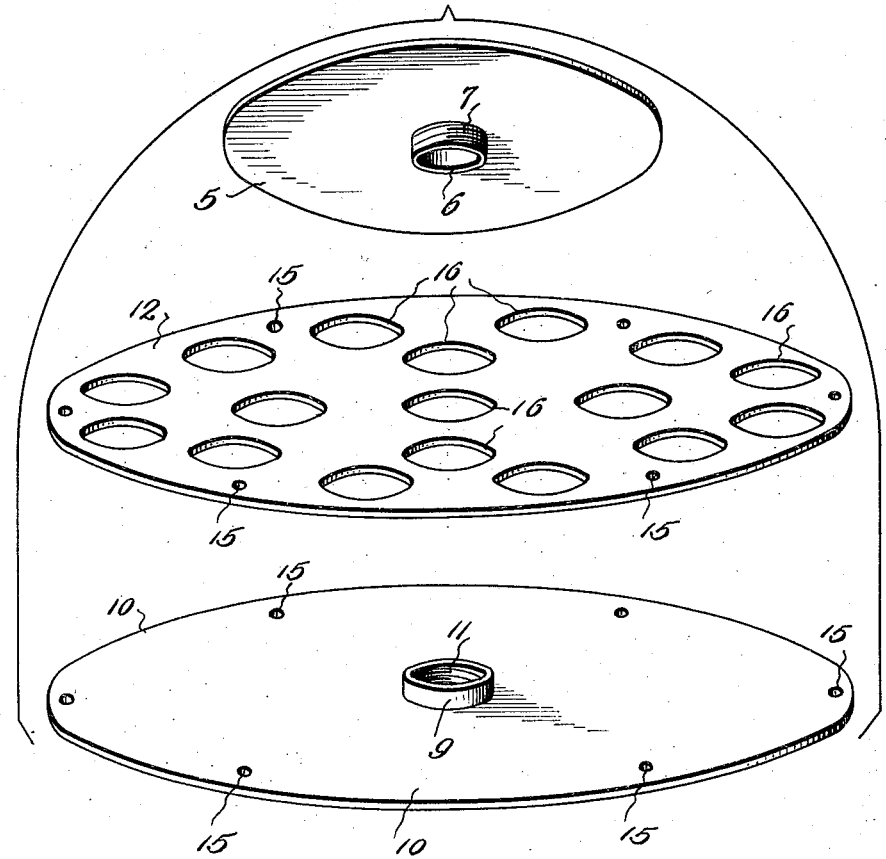
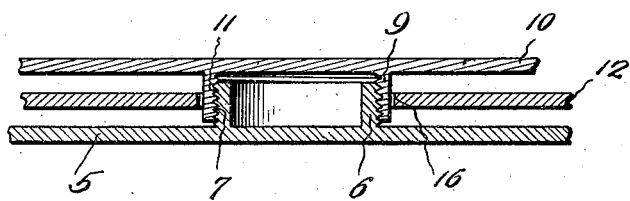

1,789,508

UNITED STATES PATENT OFFICE

THOMAS J. ADAMS, OF OSBORNE, KANSAS

ICE-CREAM-CONE CARRIER

Application filed October 10, 1929. Serial No. 398,708.

The principal object of the invention is to provide a new and improved carrier of simple and inexpensive construction, yet one which will be of great advantage for the purpose of carrying a plurality of ice cream cones.

Another object of the invention is to provide a structure which may be readily disassembled, shipped by parcel post or otherwise in disassembled form, and quickly and easily set up by the recipient.

With the foregoing in view, the invention resides in the novel subject matter hereinafter described and claimed, description being accomplished by reference to the accompanying drawings.

Fig. 1 is a perspective view.

Fig. 2 is a vertical sectional view as indicated by line 2—2 of Fig. 1.

Fig. 3 is a disassembled perspective of the base and the two disks preparatory to connecting said base and one of the disks with the other disk positioned between them.

Fig. 4 is an enlarged detail sectional view showing the base and the two disks assembled in compact form for shipment.

The preferred form of construction has been illustrated and while such construction will be herein specifically explained, it is to be understood that within the scope of the invention as claimed, variations may be made.

The numeral 5 denotes a flat base having a central upstanding projection 6 preferably in the form of an annular flange and externally threaded as indicated at 7. A tubular post 8 is threaded upon the projection 6 at its lower end, the upper end of said post being received in an annular central projection 9 on a lower disk 10 which is preferably of greater diameter than the base 5, said projection or flange 9 being provided with internal screw threads 11 detachably engaged with the upper end of said post. The internal diameter of the projection 9 is such that it may receive the projection 6 when the post 8 is disconnected from said projections, as will be clear from Figs. 3 and 4.

An upper disk 12 preferably of the same diameter as the lower disk 10, is disposed above the latter, being held in fixed relation therewith by a plurality of vertical posts 13 which are preferably of tubular form, said posts being connected with the disks by screws 14 passing through openings 15 in the disks and threaded into said posts 13. Disk 12 is provided with a plurality of openings 16 in which to insert ice cream cones, one of which is indicated in dotted lines at 17 in Fig. 1, allowing the lower ends of the cones to rest upon the disk 10. One of the openings 16 is centrally located and it will be seen from Figs. 3 and 4, that the projection 9 is of such size that it may pass through this central opening 16, when the disk 12 is interposed between the base 5 and the disk 10, after disassembling the carrier. The threads 7 and 11 of the projections 6 and 9 respectively are engageable with each other as seen in Fig. 4 and it will thus be obvious that the two disks 10 and 12 and the base 5, may be effectively secured in relatively flat formation for parcel post or other shipment. The posts 8 and 13 and the screws 14 may be contained within an envelope or the like not shown, and may be wrapped with the assembled disks and base, producing a package of small size for convenient handling.

While the device may be readily shipped in disassembled or knock-down form, it may be quickly and easily assembled by the recipient and it will constitute a convenient and advantageous device for carrying a number of ice cream cones.

The details disclosed are preferably followed, but within the scope of the invention as claimed, variations may be made as above stated.

I claim:—

1. An ice cream cone carrier comprising a flat base, a lower disk above said base, a post extending between said base and disk, upper and lower means detachably connecting said disk and base with said post, an upper disk spaced above said lower disk and having openings in which to insert the cones, and spacing means detachably connected with said disks and holding them normally in fixed relation; said upper and lower means being engageable with each other when the carrier is disassembled and being of a size to pass through one of said openings of said upper disk, allowing said upper disk to then occupy a position between the lower disk and the base.

2. A structure as specified in claim 1; said upper and lower means comprising post-engaging projections on the lower disk and the base, at least one of said projections being of annular form to receive the other projection when the carrier is disassembled.

3. A structure as specified in claim 1; said upper and lower means comprising post-engaging projections on the lower disk and the base, at least one of said projections being of annular form to receive the other projection when the carrier is disassembled, said projections and post having co-acting screw threads, the threads of said projections being engageable with each other when the carrier is disassembled.

In testimony whereof I have hereunto affixed my signature.

THOMAS J. ADAMS.